United States Patent [19]
Issler

[11] Patent Number: 5,969,671
[45] Date of Patent: Oct. 19, 1999

[54] METHOD FOR THE REAL-TIME DETERMINATION OF A TIME DELAY BETWEEN STATIONS IN A RADIOLOCATION/RADIONAVIGATION SYSTEM

[75] Inventor: Jean-Luc Issler, St Orens, France

[73] Assignee: Centre National d'Etudes Spatiales, Paris, France

[21] Appl. No.: 09/077,069

[22] PCT Filed: Dec. 18, 1995

[86] PCT No.: PCT/FR95/01688

§ 371 Date: May 15, 1998

§ 102(e) Date: May 15, 1998

[87] PCT Pub. No.: WO97/22913

PCT Pub. Date: Jun. 26, 1997

[51] Int. Cl.[6] .................... G01S 5/02; H04B 7/185
[52] U.S. Cl. ...................... 342/357.06; 342/357.01; 701/213
[58] Field of Search .............. 342/357.01, 357.06, 342/352; 375/200; 701/213

[56] References Cited

PUBLICATIONS

Alta Frequenza, vol. 51, No. 82, Sep. 1982—Oct. 1982, Milan, pp. 263–274, XP002011485 E. Detoma & S. Leschiutta: "The SIRIO–1 timing experiment."

Measurement Techniques, vol. 37, No. 1, Jan. 1, 1994, pp. 29–34, XP000471137, Gurevich E. L. et al., "Comparison of Remote Time Scales by Satellite Communications Channels Method, Apparatus, and Error".

Primary Examiner—Thomas H. Tarcza
Assistant Examiner—Dao L. Phan
Attorney, Agent, or Firm—Pearne, Gordon, McCoy & Granger LLP

[57] ABSTRACT

According to the invention, each station emits a pseudo-noise code and slaves the time at which its code is retransmitted by the satellite to a reference. The difference between the times at which codes are received in a particular station then corresponds to the time difference between the stations. Each station accesses it directly in real time.

5 Claims, 6 Drawing Sheets

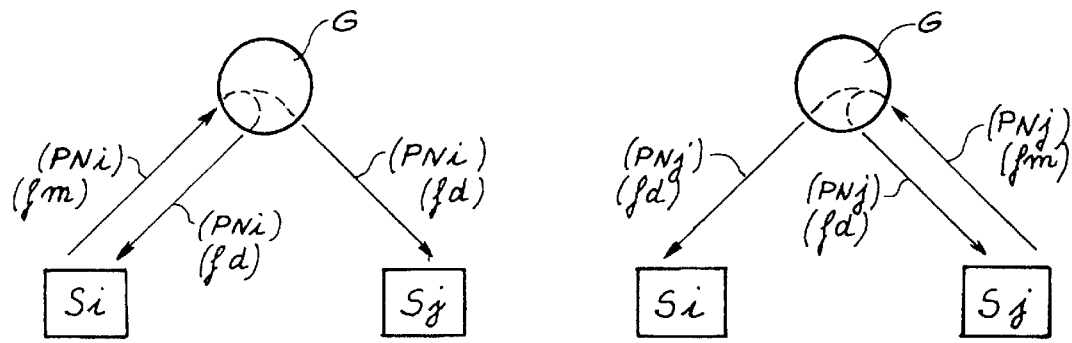
FIG. 1        FIG. 2
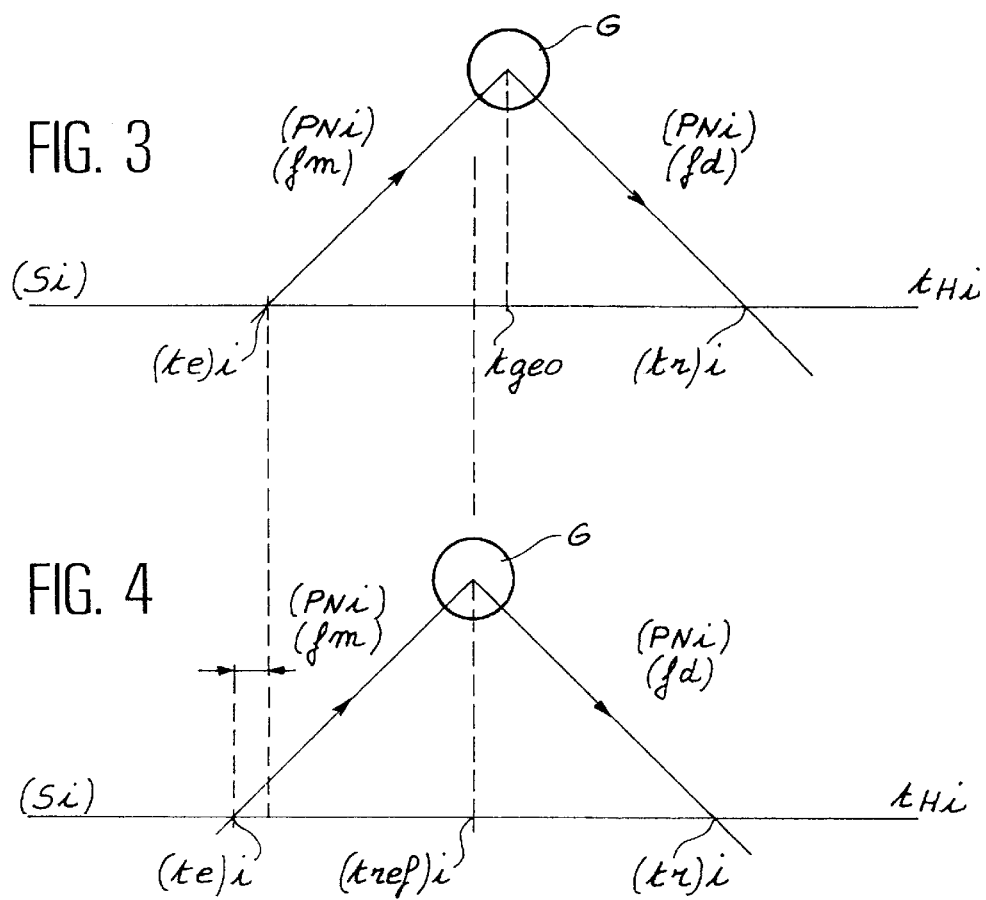
FIG. 3
FIG. 4

METHOD FOR THE REAL-TIME DETERMINATION OF A TIME DELAY BETWEEN STATIONS IN A RADIOLOCATION/RADIONAVIGATION SYSTEM

This application is a 371 of PCT/FR95/01688, filed on Dec. 18, 1995.

DESCRIPTION

1. Technical Field

The purpose of this invention is a process for determining the time difference between stations in a radio-positioning-navigation system, in real time.

2. State of Prior Art

A radio-positioning-navigation system usually includes reference stations located on the ground and connected to a processing center. One or more satellites form a bi-directional link between the stations. Vehicles (land, air, sea) equipped with appropriate radioelectric means may be positioned and/or guided with reference to the stations.

For example, known systems include the Global Positioning System (GPS) and its Russian variant GLONASS, and the preliminary plan for the European complement to the GPS system, called the CE-GPS.

In this type of system, ground stations usually include a clock acting as a time reference and it is often essential to know the difference between the references on the different stations.

One known means is to use the "Two-Way Time Transfer" technique. This technique consists of transmitting a "One Pulse Per Second" (1PPS) type signal from a station 1 to a station 2, through a repeater satellite and symmetrically transmitting from station 2 to station 1. In this case, the instant at which the pulse specific to the station is transmitted, and the instant at which the pulse from the other station is received, are measured. Each station then informs the other of the result of its measurements. This communication takes place through any type of link (telephone, electronic mail, disk, etc.). Each station is then in a position to calculate the time difference between station references, a difference which is a simple function of the measurement results carried out by each station (usually a half-sum).

Although this means is satisfactory in some respects, it is clear that it has one disadvantage, which is its delayed nature. Each station must wait to receive information from the other station before starting calculations and determining its difference with respect to the other station. The purpose of this invention is to correct this disadvantage, by proposing a process which is capable of determining the time difference between stations, in real time.

DISCLOSURE OF THE INVENTION

A known "spectrum spreading" technique is used in radio-positioning-navigation systems, that makes use of pseudo-noise codes (abbreviated as "PN" through the rest of the document). It is known that a pseudo-noise code is a periodic sequence of an odd number of bits or "bribes".

Spectrum spreading consists of modulating the useful signal by this type of pseudo-noise code, this code having a high binary flow compared with the data flow, and then modulating a carrier by the composite signal obtained. The distance of moving objects can be measured by using this type of PN codes by dating the instants at which a specific event in the code is transmitted and received with respect to the clock in a spread spectrum signal receiver. This special event is the start or end of a specific bribe in the code.

Further information about this spectrum spreading technique using pseudo-noise codes in liaison with radio-positioning-navigation may be found in the collective book entitled "Techniques et technologies des véhicules spatiaux" (*Space vehicle techniques and technologies*), Volume 1, Cépaduès-Editions, (1994), and specifically in Module 6 "Localisation spatiale" (*Space positioning*) by Jean-Luc ISSLER, pages 561–634.

In this type of technique, it is known how to synchronize the instant at which a code is retransmitted by the geostationary satellite with a time reference (GPS or other reference). This is done by offsetting the time at which this code is transmitted in a station (which correspondingly offsets the time te at which the same code is received in the said station), until the half-sum of the transmission and reception times (te+tr)/2 is equal to one reference instant tref. This is equivalent to synchronizing the satellite retransmission time to this reference.

The $$\frac{(te + tr)}{2} - tref = 0$$

relation may be considered as being a slaving relation since the first member is simply the discriminator of an onboard-ground code loop with a pure delay, the said delay being caused by the forward-return time of the signal between the station and the satellite and by the propagation time in the station on the ground.

One variant of this method may be applied if the satellite orbit, and therefore the distance D between the station and the satellite, is known precisely. Therefore the slaving relation is $$te + \frac{D}{c} - t_{ref} = 0,$$

where c is the speed of light. The distance D is such that D=c(tr−te)/2, showing that the methods are equivalent when D is replaced by its expression in the slaving relation mentioned above.

Similarly, an equivalent variant is obtained using the $$tr - \frac{D}{c} - t_{ref} = 0$$

slaving relation.

This invention makes use of these slaving techniques, with the purpose of synchronizing a modulation signal transmitted by a satellite on a reference clock on the ground, by using them in several stations (at least two) simultaneously, such that the difference between the references of the two time stations appears directly in each of the two stations through the times at which codes specific to the two stations are received. Therefore there is no longer any need to transmit the results of measurements from one station to another so that each station can calculate the difference between time references. Determination is direct and immediate.

Therefore more precisely, the purpose of the invention is a process for determining the time difference between several stations in a radio-positioning-navigation system in real time, this system also comprising a satellite equipped with a repeater, this process being characterized by the fact that it comprises the following operations:

a) at least one pseudo-noise code specific to each station is produced in the station, the codes transmitted by two different stations being orthogonal;

b) the code specific to each station is transmitted from this station at a transmission time identified with respect to a time reference specific to this station;

c) the various codes transmitted by the various stations are received in the satellite and are retransmitted to the said stations;

d) each code retransmitted by the satellite is received in each station and the reception time of the code specific to the station is determined with respect to the time reference of the station;

e) in each station, the transmission time of the code specific to this station is shifted until the half-sum of the transmission and reception times of the code specific to the station coincides with a reference time defined with respect to the time reference of this station;

f) in an arbitrary station, the reception time of the code originating from another station is measured;

g) in this station, the difference between the reception time of the code specific to this station, and the reception time of the code specific to the said other station is then determined, this difference then giving the difference between the time references of the station concerned and the other station, in real time.

BRIEF DESCRIPTION OF THE DRAWINGS

FIG. 1 schematically shows transmission and reception of a first pseudo-noise code specific to a first station;

FIG. 2 schematically shows transmission and reception of a second pseudo-noise code specific to a second station;

FIG. 3 is a time diagram showing the code transmission and reception times;

FIG. 4 is another time diagram showing slaving of the retransmission time in the geostationary satellite to a reference time;

DETAILED DESCRIPTION OF EMBODIMENTS

FIGS. 1 and 2 schematically show exchanges between stations in the same radio-positioning-navigation system. In a non-restrictive manner, the system shown only comprises two stations. These stations are marked by the letter S with a subscript i or j, and pseudo-noise codes by the usual abbreviation PN plus a subscript i or j corresponding to the station that transmits it. For example, the geostationary satellite is identified by the letter G.

An arbitrary station Si transmits a code Pni to the satellite using a carrier at frequency ni, (the "up" frequency). The satellite G receives and retransmits this code using a carrier at frequency fd ("down" frequency). The code PNi returns to station Si but is also received by the other stations Sj (FIG. 1).

Similarly (FIG. 2), station Sj transmits a carrier at frequency fm that transports a code PNj. The carrier is retransmitted at frequency fd and the code PNj returns to station Sj and reaches station Si.

The codes used are orthogonal, in other words there is no correlation between a code transmitted by one station Si and a code transmitted by a station Sj, when i is different from j, so that each station can distinguish its own code from codes transmitted by other stations.

Figure 5:
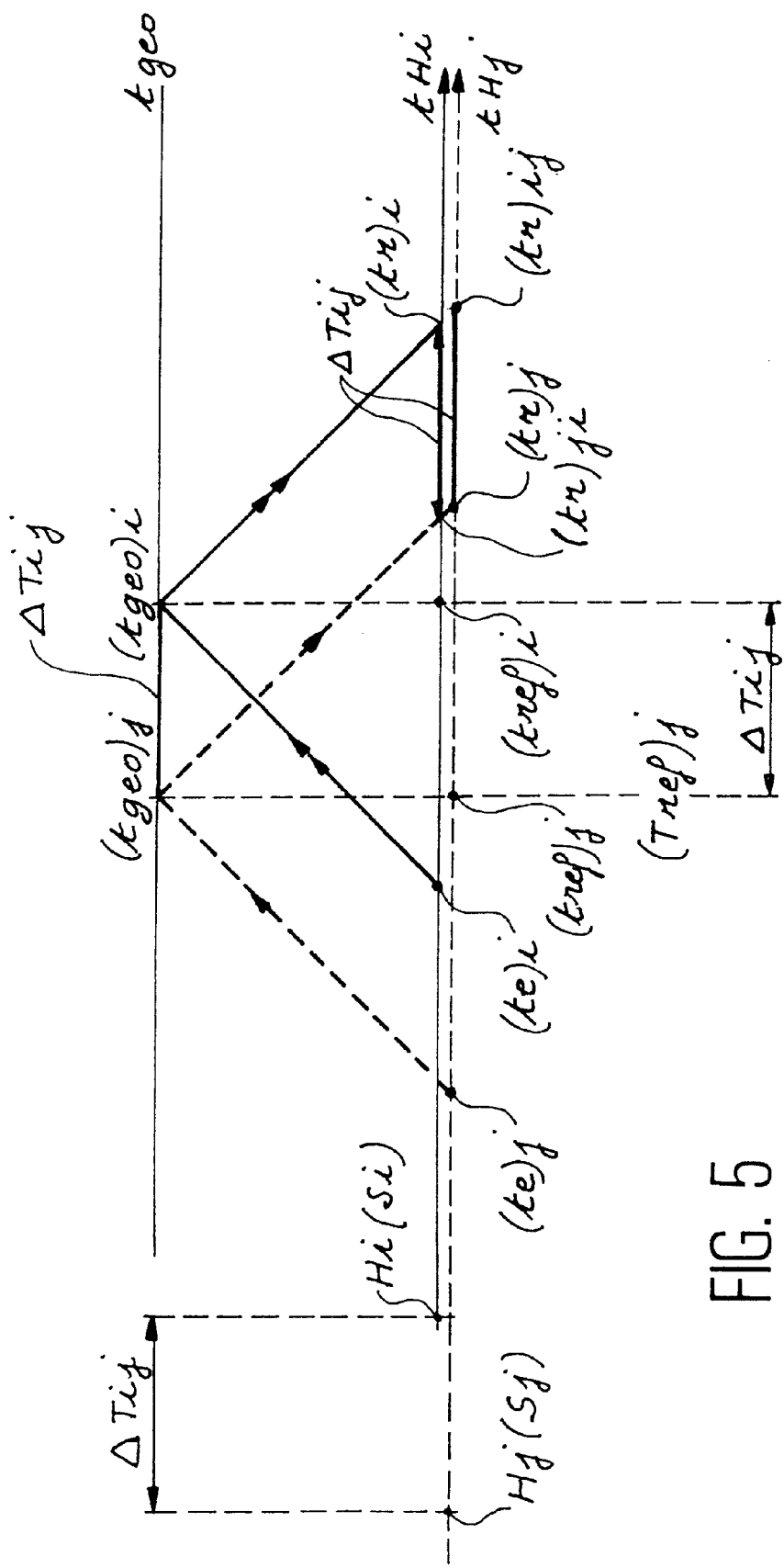
FIG. 5 is a double time diagram showing various code transmission and reception times and the time difference between two stations.

FIGS. 3, 4 and 5 are time diagrams illustrating different code transmission and reception times.

Firstly FIG. 3 shows the transmission instant (te)i of the code PNi transmitted by station Si. This instant is marked with respect to a time reference Hi. This reference may be a cesium or rubidium clock for example, or any other means.

The code PNi is retransmitted by the geostationary satellite G at time (tgeo)i and is received by station Si at time (tr)i.

FIG. 4 shows how this transmission-reception process is slaved to a reference instant (tref)i, always defined with respect to the time frequency Pi. This is done by offsetting the transmission time (te)i of the code specific to the station until the half-sum ½(te)i+(tr)i) of the transmission (te)i and reception (tr)i times of the code PNi coincides with the reference time (tref)i. This is equivalent to saying that the retransmission time (tgeo)i is slaved to (tref)i since (tgeo)i is equal to the half-sum concerned.

This slaving is done in each station. FIG. 5 then illustrates the time diagram of transmissions-receptions in any two stations Si, Sj. Each transmission time (te)i, (te)j was adjusted so that the reference times (tref)i, (tref)j identified with respect to the time references Hi, Hj coincide with the half-sum of the transmission and reception times, namely firstly ½((te)i+(tr)i) and secondly ½((te)j+(tr)j). In other words, the satellite retransmission times (tgeo)i and (tgeo)j are slaved to (tref)i and (tref)j.

If the time references Hi and Hj are offset from each other by a quantity ΔTij, the reference times (tref)i and (tref)j are offset by the same quantity, and the same is true for reception times in the same station (Si) of the code specific to the station Si and the code specific to the other station Sj. The quantity (tr)i–(tr)ji, measured in Hi, and the quantity (tr)j–(tr)ij measured in Hj, both give the difference ΔTij between time references Hi and Hj directly.

Therefore each station can immediately measure the difference between its time reference and the reference of another station by simply measuring the reception times of its own code and of the code corresponding to the other station. In FIG. 5, this difference ΔTij is shown on the axis tHi specific to station Si, and also on the thj axis specific to station Sj.

FIGS. 6 to 11 illustrate some embodiments of the process that has just been described.

Figure 6:
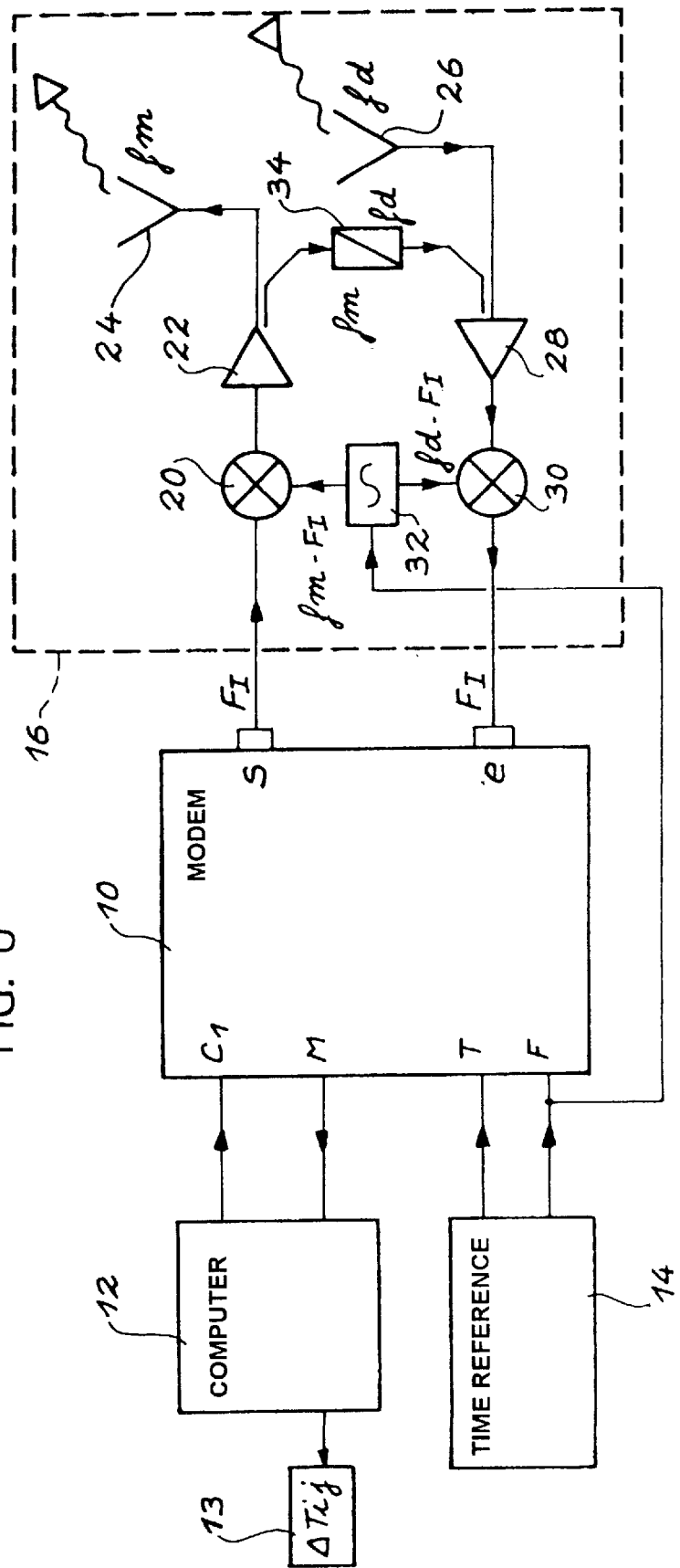
FIG. 6 is a block diagram showing a station embodying the process according to the invention.

FIG. 6 shows the synoptic diagram of a station. It contains a modem (modulator-demodulator) 10 of the time/frequency type, a computer 12 with a module displaying the time difference 13, a time reference 14 and a transmission-reception set 16.

The computer 12 may be of any type (PC, workstation, etc.). Digital links between the computer 12 and the time/frequency modem 10 may be of the RS232 or RS422 type (or other). The software contained in the computer performs two types of functions:

a first function which is to slave the modem as described above, auxiliary functions such as the measurement of the distance between the modem and the geostationary satellite used.

The computer may also be integrated in the time frequency modem itself.

The time reference 14 is a cesium or rubidium (or other) type of clock. This clock may be free or slaved to an external time (UTC time, GPS time, GLONASS time, etc.). Clock 14 also produces a time reference in the form of periodic electrical pulses of the PPS ("Pulse Per Second") type and more generally of the PPkS ("Pulse Per k Seconds") type and also a frequency reference in the form of a sinusoidal or square electrical signal (not restrictive). The frequency of this signal may, for example, be 10 MHz or 5 MHz.

The slaved time/frequency modem 10 has four inputs:
one digital control input C connected to the computer,
one time reference input T related to the time reference 14,
one frequency reference input F related to the time reference 14,
one input E receiving the intermediate frequency signal received by the transmission-reception station (pseudo-noise code in intermediate frequency).

The modem 10 also has two outputs:
one output M that sends the measurement results at transmission time te, reception time tr and the reference time tref, to the computer,
an output S that outputs an intermediate frequency signal carrying the pseudo-noise code.

The pseudo-noise codes used may be known codes such as C/A-GPS or C/A GLONASS or C/A-INMARSAT, or HARTLE, or P-GPS, or P-GLONASS, etc.

The transmission-reception set 16 comprises a mixer 20, a transmission amplifier 22, a transmission antenna 24 operating at the up frequency fm, a reception antenna 26 working at the down frequency fd, a reception amplifier 28, a mixer 30, a local oscillator 32 receiving the frequency transmitted by the time reference 14 and outputting two signals at frequencies fd-FI and fm-FI forwarded to mixers 20 and 30 respectively, and finally a frequency translator 34 receiving part of the transmission signal at frequency fm and outputting a signal at frequency fd subsequently combined with the reception signal. This frequency translator fm/fd placed between the two antennas is used for global calibration purposes (measurement of the sum of the propagation times in the transmission channel and in the reception channel).

The transmission set 16 operates at three frequencies:
a frequency IF (I in the figures) which is the intermediate frequency of the signals interfacing with the modem. The possible values of this intermediate frequency may be either the standard frequency 70 MHz, or one of the frequencies of signals L1 or L2 in the GPS or GLONASS system, or 1575.42 MHz or 1227.60 MHz for the GPS system,
a frequency fm which is the frequency of the up signal to the repeater in orbit, obtained after mixing with the modem output signal in IF,
a frequency fd which is the frequency of the down signal from the repeater in orbit.

It will be observed that: there is no need to use a mixer 30 in the reception channel if fd=IF.

Figure 7:
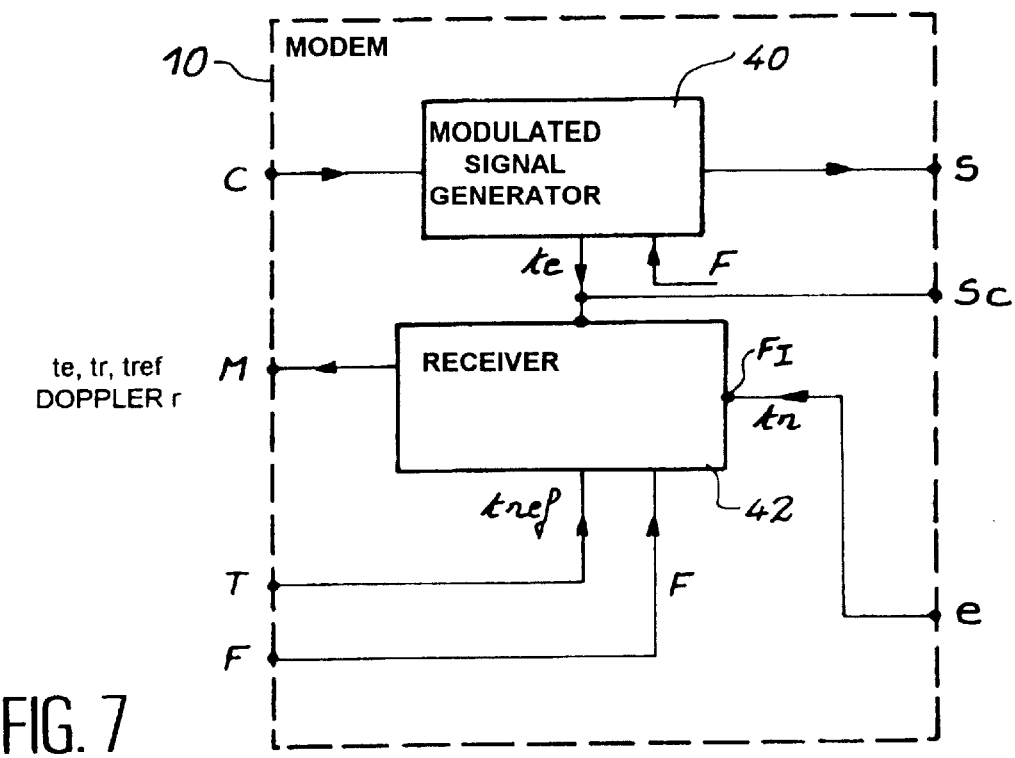
FIG. 7 illustrates a first way of making a modem.
Figure 8:
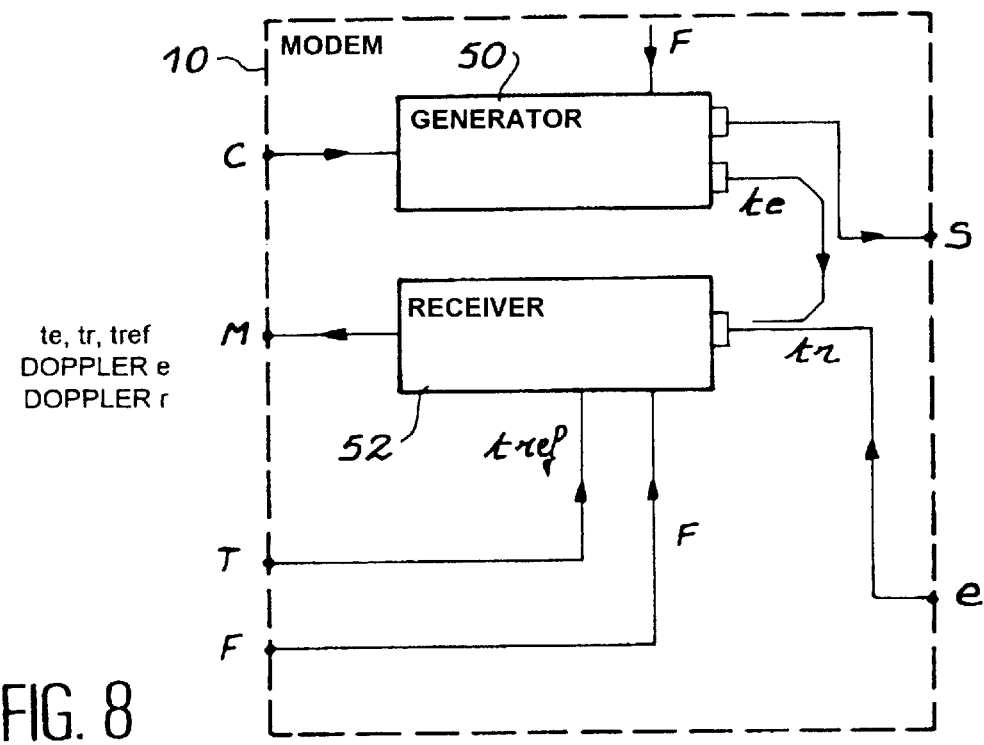
FIG. 8 illustrates a second way of making a modem.
Figure 9:
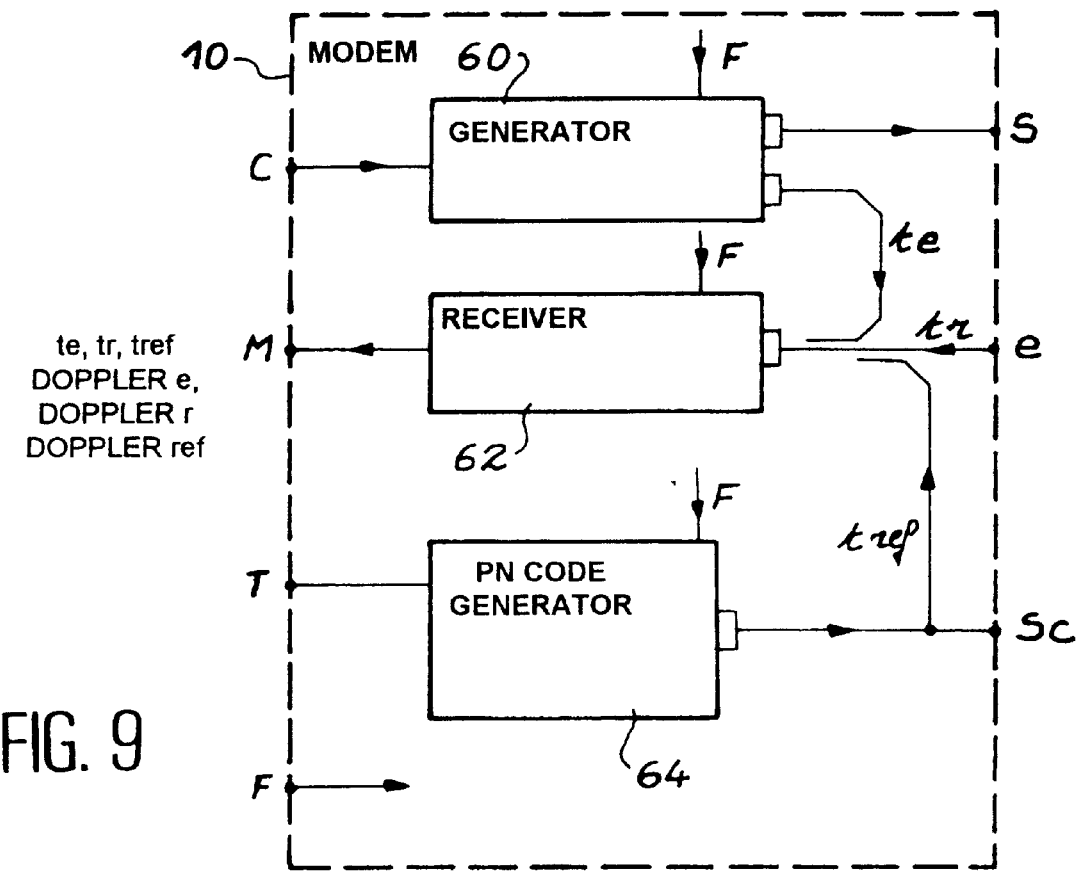
FIG. 9 illustrates a third way of making a modem.

FIGS. 7 to 9 illustrate a few examples of the architecture of time/frequency modems that can be used in the invention.

In the variant shown in FIG. 7, the modem 10 comprises a modulated signal generator 40 operating at intermediate frequency IF, this generator being located between the input C and the output S, a receiver 42 adapted to the modulation used by the generator 40, this receiver being placed between the input e and the output M; it receives the time reference tref through input T, and the reference frequency through input F; it receives the transmission time te from generator 40; the adapted receiver 42 receives the reception signal from the input e which will be used to determine the reception time tr, and it outputs times te, tr, tref at the output M for the computer (together with information particularly related to DOPPLER effect measurements). Sc is an additional output used to calibrate the slaved modem Tf.

Schematically, this circuit operates as follows.

The modulated signal generator 40 creates a carrier at the output S, at the IF frequency modulated by the periodic pseudo-noise code (PN code), together with digital data organized in the form of periodic frames. The generator also generates an electrical signal te synchronous with the PN code present on output S.

The receiver 42 adapted to the pseudo-noise code used by the generator is equipped with:
an IF input, that enables it to receive the radioelectric signal,
two inputs used for dating periodic external electrical events te and tref.

The receiver 42 dates the specific events received (tr, te and tref).

The modem in FIG. 8 comprises a generator 50 generating two orthogonal and synchronized pseudo-noise codes PNi and PNi', and a receiver 52.

The receiver 52 receives one of the codes output by the generator 50, and the code received on the input e, on one input at the intermediate frequency IF. It also receives the reference signal used to date the time tref. Finally, it also receives the reference frequency. The receiver 52 dates times te, tr and tref and transmits this information to the computer through output M (possibly with other information, for example concerning the DOPPLER effect).

Like the modem in FIG. 8, the modem in FIG. 9 contains a generator 60 of two PN codes and a code receiver 62. It also contains a PN code generator 64 slaved onto the time reference. This generator receives periodic pulses from the time reference and outputs a synchronous PN code. The receiver 62 then receives three radio-electric signals, the first synchronous with the transmitted code and fixing te, the second being the received signal and fixing tr, the third synchronous with the time reference and fixing tref. In one variant, the receiver 62 does not have any input used for dating electrical events as in the variants in FIGS. 7 and 8.

Figure 10:
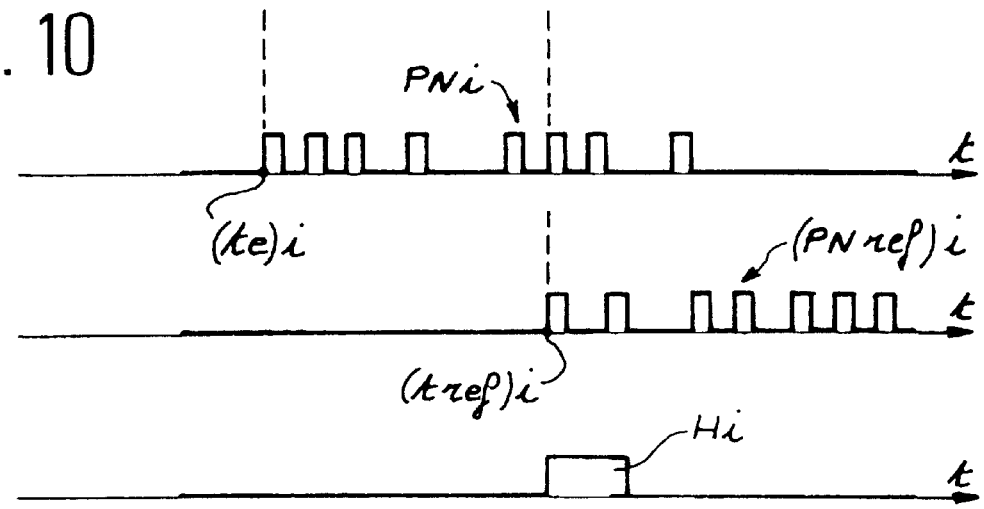
FIG. 10 schematically illustrates a variant in which the time reference itself is in the form of a pseudo-noise code.

In liaison with this variant in FIG. 9, FIG. 10 schematically shows two pseudo-noise codes with their succession of bribes equal to 0 or 1. One is the transmitted code PNi (first line), the other is a reference code PNref (second line) which acts as a reference. A particular event of these codes, for example the rising front of the first bribe, marks the transmission or reference instant. The third line shows a pulse in a periodic stream produced by the clock. The reference code PNref is synchronous with this pulse.

Figure 11:
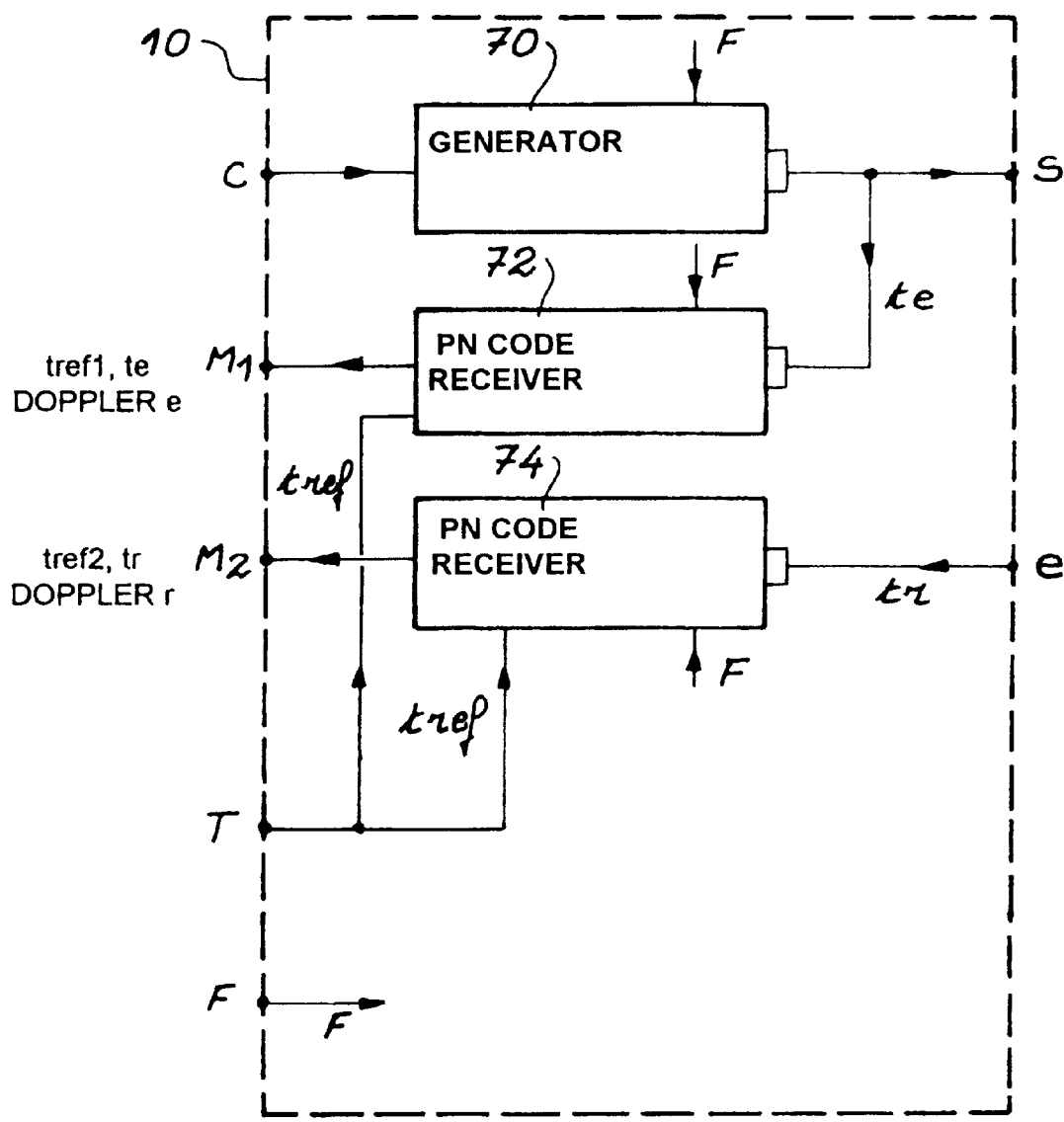
FIG. 11 illustrates a fourth way of making a modem.

The modem shown in FIG. 11 uses a generator 70 of a single slaved PN code, but two PN code receivers, 72 and 74 respectively, are used. One (72) receives the radioelectric transmission signal and the other (74) receives the radio-electric reception signal. Each of these receivers is equipped with an input intended for dating electrical events tref output from the time reference. Therefore the modem has two outputs M1, M2, outputting a time reference tref1, the transmission time te and possibly a DOPPLER effect on the transmission signal on M1, and the time reference tref2, the reception time tr and a DOPPLER effect on the reception signal on M2.

In all these modem variants, the modem can be calibrated by looping output S onto input e, taking account of delays introduced by the various circuits.

The means that have just been described above may in some cases take standard forms. Thus with an intermediate frequency chosen to correspond to the frequency of the L1 signal in the GPS system, namely 1575.42 MHz, and with a GPS or INMARSAT C/A type pseudo-noise generator, intermediate frequency PN code generators will be conventional GPS generators and intermediate frequency PN code receivers will also be GPS receivers. In this respect, note that a distinction is made between two receiver categories:

"navigation" GPS receivers without any external dating input (which corresponds to the variant shown in FIG. 10), "time oriented" GPS receivers with an external dating input (which corresponds to the variants shown in FIGS. 8, 9, 11).

The same results are obtained by using the frequency of the GPS system signal (1227.60 MHz) as intermediate frequency, with a GPS or INMARSAT C/A type PN code, or by taking the FL2 frequency in the GLONASS system with a GLONASS C/A type PN code.

Finally, by using IF=fd=FL1 in the GPS system or FL1 in the GLONASS system, there is no mixer 30 in the transmission/reception station (see FIG. 6). On the other hand, the slaved modem reception channel may be coupled with a channel for the reception of the signals transmitted by the GPS constellation.

Thus, the functions of a time oriented GPS receiver are added to the slaved modem.

Finally, it will be seen that in the case in which the architecture of the pseudo-noise code receiver used is such that good coherence between the code and the received intermediate frequency signal carrier is necessary in order to carry out correct and permanent measures, it must be possible to use a second slaving by the slaved modem, namely slaving of the carrier. This is done by measuring the DOPPLER effect affecting the received intermediate frequency signal, and deducing the radial pseudo-speed of the carrier, Vp. The DOPPLER effect affecting the received intermediate frequency code is calculated in order to measure tr, and the radial pseudo-speed of the code, Vc, is deduced. The purpose of slaving the carrier is to offset the transmitted signal frequency (output S) such that DOPPLER effects are the same (Vc=Vp).

I claim:

1. Process for determining the time variation between several stations (Si), (Sj) in a radio-positioning-navigation system in real time, this system also comprising a satellite (G) equipped with a repeater, this process being characterized by the fact that it comprises the following operations:

a) at least one pseudo-noise code (PNi) specific to each station (Si) is produced in the station (Si), the codes (PNi), (PNj) transmitted by two different stations (Si), (Sj) being orthogonal;

b) the code (PNi) specific to each station (Si) is transmitted from this station at a transmission time (te)i identified with respect to a time reference (Hi) specific to this station (Si);

c) the various codes (PNi) transmitted by the various stations (Si) are received in the satellite (G) and are retransmitted to the said stations (Si);

d) each code retransmitted by the satellite (G) is received in each station (Si) and the reception time (tr)i of the (PNi) code specific to the station (Si) is determined with respect to the time reference (Hi) of the station (Si);

e) in each station (Si), the transmission time (te)i of the code specific to this station is shifted until the half-sum ((te)i+(tr)i)/2 of the transmission time (te)i and reception time (tr)i of the code (PNi) specific to the station (Si) or the quantity (te)i−D/c or (tr)i−D/c, where D is the known distance between this station and the satellite and c is the speed of light, coincides with a reference time (tref)i defined with respect to the time reference (Hi) of this station (Si);

f) in an arbitrary station (Si), the reception time (tr)j of the code originating from another station (Sj) is measured;

g) in this station (Si), the difference between the reception time (tr)i of the code (PNi) specific to this station (Si), and the reception time (tr)ji of the code (PNj) specific to the said other station (Sj) is then determined, this difference ((tr)i−(tr)ji) then giving the difference (ΔTij) between the time references (Hi), (Hj) of the station concerned (Si) and the other station (Sj), in real time.

2. Process according to claim 1, characterized by the fact that a periodic pulse stream is used as the time reference (Hi) in each station (Si).

3. Process according to claim 2, characterized by the fact that the reference time (tref)i used in each station (Si) is a particular event in a synchronous pseudo-noise code (PNref) of periodic pulses forming the time reference (Hi).

4. Process according to claim 3, characterized by the fact that two synchronous pseudo-noise codes (PNi), (PNi') are produced, one (PNi) being transmitted to the satellite, the other (PNi') marking the instant at which the first (PNi) is transmitted.

5. Process according to claim 1, characterized by the fact that in each station (Si), the DOPPLER effect affecting the pseudo-noise code (PNi) thus received is measured, together with the DOPPLER effect affecting the carrier modulated by the said pseudo-noise code (PNi), and that the carrier frequency is offset until the two DOPPLER effects are equal.

* * * * *

UNITED STATES PATENT AND TRADEMARK OFFICE
CERTIFICATE OF CORRECTION

PATENT NO.   : 5,969,671
DATED        : October 19, 1999
INVENTOR(S)  : Issler

It is certified that error appears in the above-indentified patent and that said Letters Patent is hereby corrected as shown below:

Column 3, Line 66, delete "ni," and insert --fm--.

Column 4, Line 24, delete "Pi." and insert --Hi.--.

Column 5, Line 52, delete "(I" and insert --(FI)--.

Column 5, Line 64, after "that" delete --:--.

Column 6, Line 6 delete "input e" and insert --input e--.

Signed and Sealed this

Eleventh Day of April, 2000

Q. TODD DICKINSON

*Attest:*

*Attesting Officer*     *Director of Patents and Trademarks*